US006910966B2

(12) United States Patent
Leifer

(10) Patent No.: US 6,910,966 B2
(45) Date of Patent: *Jun. 28, 2005

(54) DEDICATED WIRELESS DIGITAL VIDEO DISC (DVD) CONTROLLER FOR VIDEO GAME CONSOLES

(75) Inventor: Richard Leifer, Melville, NY (US)

(73) Assignee: Arista Enterprises Inc., Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/738,515

(22) Filed: Dec. 18, 2003

(65) Prior Publication Data

US 2004/0132533 A1 Jul. 8, 2004

Related U.S. Application Data

(63) Continuation of application No. 10/092,742, filed on Mar. 7, 2002, now Pat. No. 6,786,822, which is a continuation of application No. 09/649,740, filed on Aug. 28, 2000, now Pat. No. 6,565,441, which is a continuation-in-part of application No. 09/544,231, filed on Apr. 7, 2000, now Pat. No. 6,565,440.

(51) Int. Cl.$^7$ ................................................ A63F 13/00
(52) U.S. Cl. ........................................................ 463/37
(58) Field of Search ................................. 461/1, 36–39

(56) References Cited

U.S. PATENT DOCUMENTS 5,605,505 A * 2/1997 Han .............................. 463/39
6,213,880 B1 * 4/2001 Sim .............................. 463/37

* cited by examiner

*Primary Examiner*—Kim Nguyen
(74) *Attorney, Agent, or Firm*—Keusey, Tutunjian & Bitetto, P.C.

(57) ABSTRACT

The dedicated DVD remote control transmitter has DVD player function control buttons and has an absence of control over game functions of the video game console at all times. The dedicated remote control transmitter wirelessly transmits DVD player control commands to at least one of the IR receiver and the RF receiver for controlling the DVD player functions of the video game console when in the second entertainment mode. The wireless game controller wirelessly transmits game control commands to at least one of the IR receiver and the RF receiver to control a game being played when the video game console is in the first game mode.

19 Claims, 9 Drawing Sheets

DEDICATED WIRELESS DIGITAL VIDEO DISC (DVD) CONTROLLER FOR VIDEO GAME CONSOLES

CROSS REFERENCE TO RELATED APPLICATIONS

This application is a Continuation of U.S. patent application Ser. No. 10/092,742 filed Mar. 7, 2002 now U.S. Pat. No. 6,786,822, which is a Continuation-in-Part of application Ser. No. 09/649,740 filed Aug. 28, 2000, now U.S. Pat. No. 6,565,441 issued on May 20, 2003, which is a Continuation-in-Part of application Ser. No. 09/544,231 filed Apr. 7, 2000, now U.S. Pat. No. 6,565,440 issued on May 20, 2003.

BACKGROUND OF THE INVENTION

1. Field of the Invention

The present invention relates to console video gaming systems, and more particularly, to a wireless digital video disc (DVD) controller and interface for console video gaming systems capable of playing other media such as DVDs.

2. Description of the Related Art

The new age of console video game systems now includes an additional feature of playing digital video discs (DVDs). "DVD" may also be used to describe digital versatile discs, which include digital video discs. This feature gives the console game system a dual function of playing video games and DVD's at the user's choice. Thus, the video game console capable of playing DVDs can now be integrated into a home entertainment system for more than just video game playing. One example of such console video game system is the Sony Playstation® II which is expected to be available in the U.S. retail market later this year. It is also believed that other manufacturers will incorporate this dual function ability in the near future.

The Playstation® II includes two game controller ports for receiving two game controllers for use in operating the games. In addition, the DVD functions of the Playstation® II are also controlled through the use of one of the two game controllers (e.g., controller No. 1). Various buttons on the game controller can be used to control various playing features of the DVD being viewed.

Generally, the game console with wired controllers is proximate to the television it is connected to. Thus, the primary drawback to the game console that can play DVDs is that the game controller must be plugged into the game console in order to control the DVD functions. Thus, the wired "remote" control (i.e., game controller) for the DVD functions of the game console is a significant limitation on the user's ability to sit back and enjoy a DVD without either having the game console with wired "remote" near the sitting area for viewing the television, or being required to get up each time a DVD player control function is desired. This is especially a drawback when the video game console is connected to, and is part of the user's audio/video entertainment system.

A wireless game controller such as that disclosed in U.S. Pat. No. 5,605,505 may be implemented to eliminate this problem of a wired controller, however, the button designations of the wireless game controller will not necessarily correspond with that of the wired controller for this system, nor will they correspond in function or position with the designated control functions of the DVD player. As such, the user is required to learn the game controller button symbols and/or letters that control the various functions of the DVD player of the device.

SUMMARY OF THE INVENTION

The problems stated above, as well as other related problems of the prior art, are solved by the present invention, which is directed to a wireless system for a video game console.

According to an illustrative embodiment of the present invention, there is provided a wireless system for a video game console having at least one of an InfraRed (IR) receiver and a Radio Frequency (RF) receiver, and further having at least two operation modes including (i) a first game mode capable of playing video games and (ii) a second entertainment mode capable of playing DVD videos. The wireless system includes a dedicated DVD remote control transmitter and a wireless game controller. The dedicated DVD remote control transmitter has DVD player function control buttons and has an absence of control over game functions of the video game console at all times. The dedicated remote control transmitter wirelessly transmits DVD player control commands to at least one of the IR receiver and the RF receiver for controlling the DVD player functions of the video game console when in the second entertainment mode. The wireless game controller wirelessly transmits game control commands to at least one of the IR receiver and the RF receiver to control a game being played when the video game console is in the first game mode.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference numerals denote similar elements throughout the views.

DETAILED DESCRIPTION OF PREFERRED EMBODIMENTS

Figure 1:
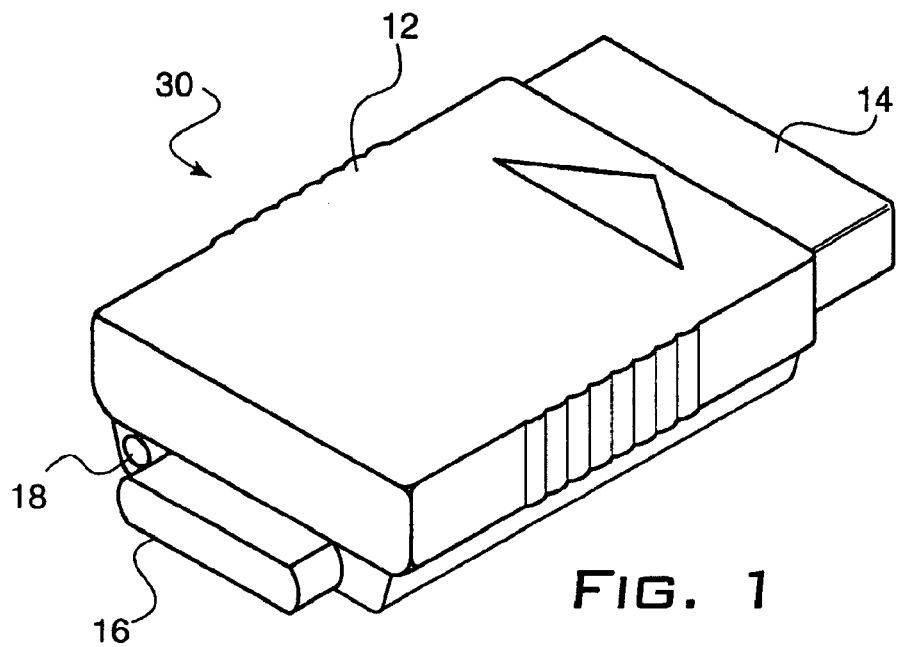
FIG. 1 is a perspective view of the wireless adapter device according to a first embodiment of the invention.
Figure 2A:
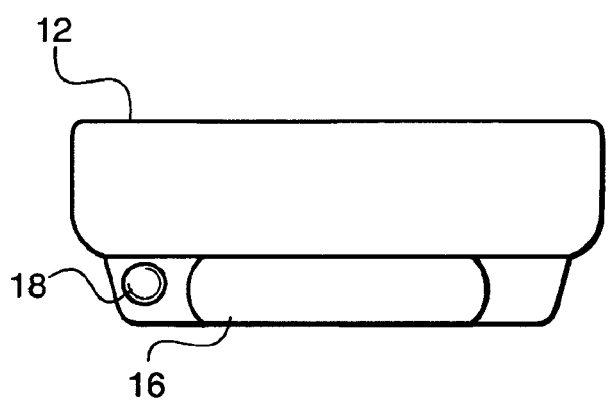
FIG. 2a is a front view of the wireless adapter device according to the first embodiment of the invention.
Figure 2B:
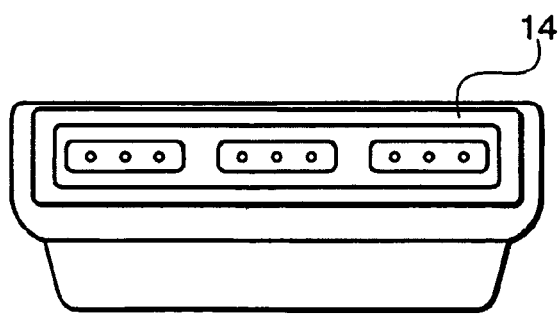
FIG. 2b is a rear view of the wireless adapter device according to the first embodiment of the invention.

Referring to FIGS. 1, 2a and 2b, there is shown a wireless adapter/receiver 10 according to a first embodiment of the present invention. Adapter 10 includes a body 12, a male plug 14 on one end for connection to a game controller port 70a and/or 70b of a game console 60 (FIG. 6) and an infrared (IR) receiver 16 opposite plug 14. An indicator light 18 is included for indicating when IR receiver 16 is receiving an IR transmission from an IR transmitter (discussed with reference to FIG. 5).

Adapter 10 converts the game controller port 70a or 70b or other communication port of a video game console 60 into a wireless receiver capable of receiving and inputting control commands into the game console. In accordance with the present invention, the adapter/receiver 10 receives the wireless signals from the remote control 50 (FIG. 5) and converts the wireless signals into electrical signals for input into the game console. In accordance with a preferred embodiment, the wirelessly transmitted and received control commands are exclusively the commands necessary to control the DVD or other non-game media playing functions of the game console.

Figure 6:
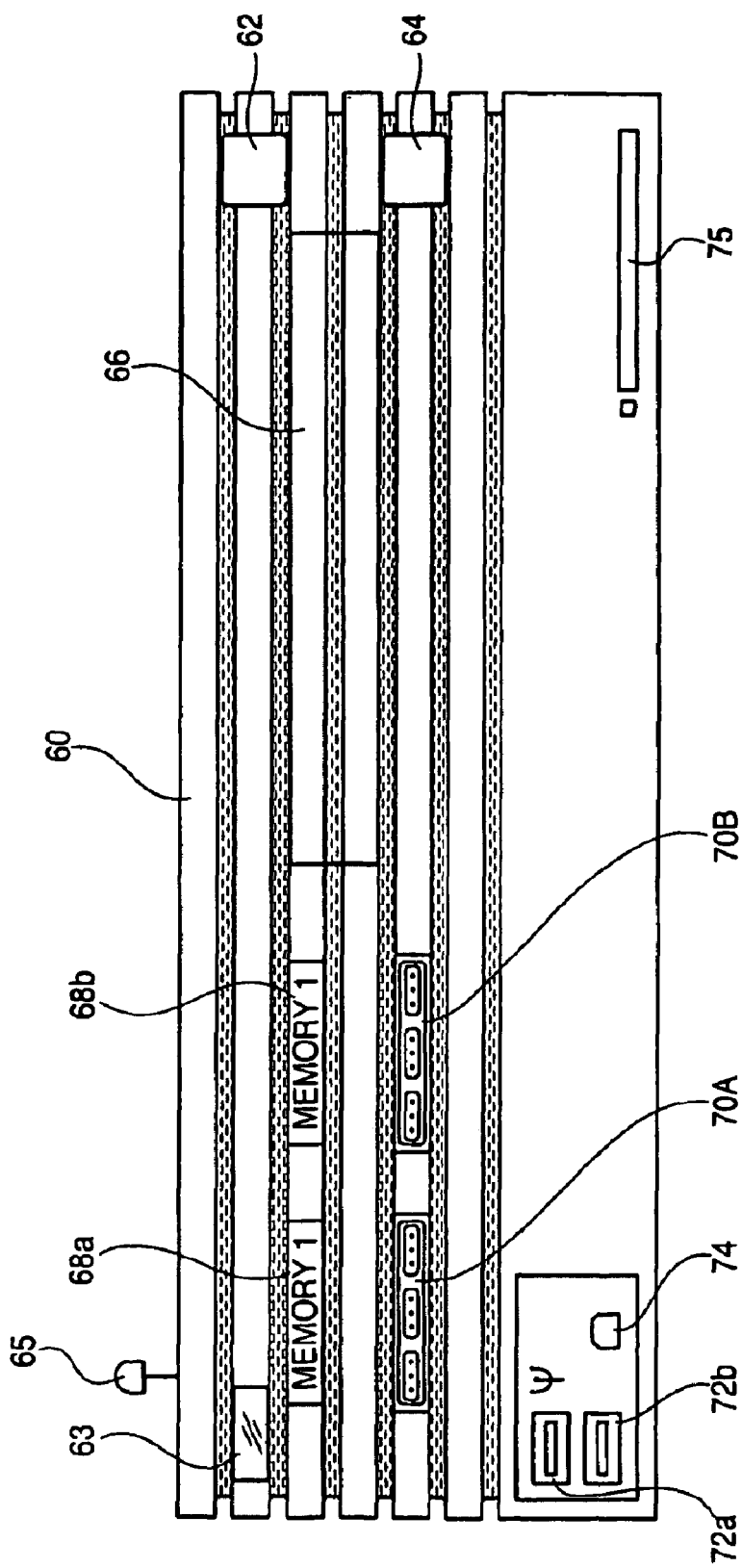
FIG. 6 is a diagram of an exemplary game console that utilizes the dedicated DVD controller of the present invention.

According to one embodiment, adapter/receiver 10 uses one game controller port 70a or 70b of the game console 60 (FIG. 6). As such, when adapter/receiver 10 is in its operable position within the game controller port, the used game controller port is no longer available for use with a game controller.

Figure 7:
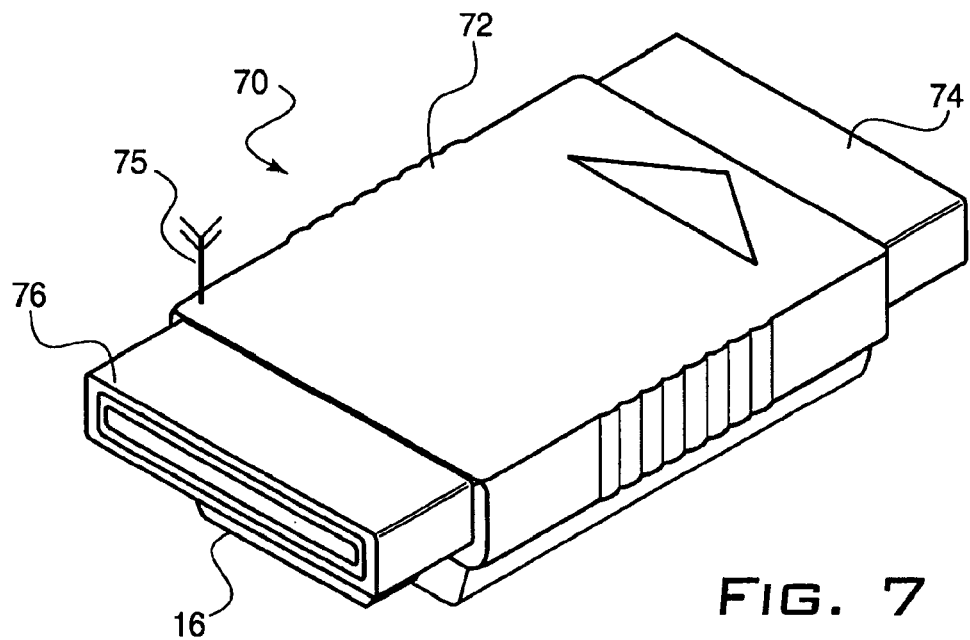
FIG. 7 is a perspective view of the game console wireless adapter device according to a third embodiment of the invention.

The game console 60 of FIG. 7 is capable of playing other entertainment media such as DVDs and audio compact discs (e.g., Sony Playstation II®) and also includes various other communication ports such as universal serial bus (USB) ports 72a and 72b, an IEEE 1394 FireWire™ port 74 and also includes a PCMCIA slot 75 for receiving a PCMCIA card. It is contemplated herein that any one of these additional ports or PCMCIA slot may also be used to provide the necessary interface for a wireless controller. For example, one of the two (2) USB ports may be used to connect a wireless adapter that is capable of receiving and providing control data to the game console and thereby control the various game playing and other media playing features associated with the game console. The use of a PCMCIA card adapted to provide a wireless interface with the game console may also be readily implemented in this manner. The FireWire™ port of the game console is a dedicated high bandwidth port that provides an increased capacity data communication port for data streaming into and out of the game console. This port can provide a very fast and reliable communication connection with the game console, and as such, is also a prime candidate for receiving a wireless adapter as suggested by the present invention.

Figure 5:
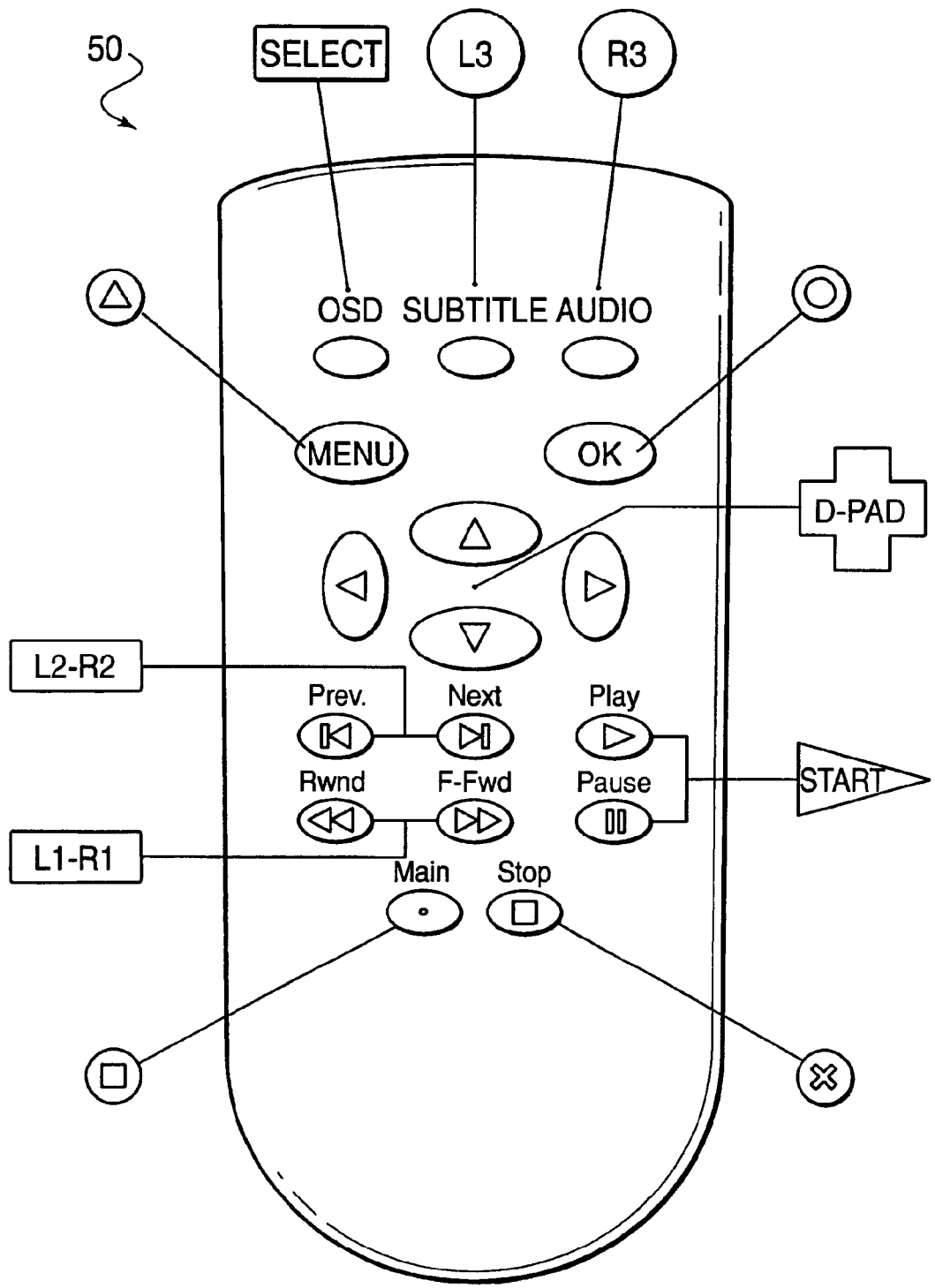
FIG. 5 is an embodiment of the dedicated wireless DVD controller for use with the game console wireless adapter according to the present invention.

Since the game console is designed to use a game controller as the DVD player controller, the buttons on the game controller corresponding to the DVD player functions have game controller symbols and not DVD player symbols. In this configuration, the user is required to identify the various game controller buttons according to their DVD functions, either through the use of a printed chart, or through navigable menus on the display screen. This is not only inconvenient for the user, but is also confusing. As shown in FIG. 5, the dedicated DVD controller 50 of the present invention provides the user with a standard type DVD player remote control, where the game controller symbols are no longer visible to the user, and the corresponding buttons for activating DVD player functions are similar, if not identical, to those buttons the user would ordinarily associate with the DVD player functions. The buttons of the dedicated DVD controller 50 have identifying indicia representative of the corresponding function, in addition to including indicia disposed adjacent the buttons where appropriate. By way of example, these functions include play, pause, on screen display (osd), stop/exit, main menu, DVD menu, confirm/accept/ok, back to previous chapter, skip to next chapter, rewind, fast forward, toggle subtitles, toggle sound options, and a D-pad for use in navigating menus, etc.

In accordance with the present invention, controller 50 is a wireless infrared transmitter capable of transmitting only those predetermined game controller commands that control the various DVD player functions of the game console. Since the game console can also play audio CDs, those media playing functions may also be controlled by the dedicated remote control 50 according to the invention. Table 1 represents one embodiment of the button configuration of controller 50 as they correspond to the game controller buttons (and corresponding button symbols) that would be found on the wired game controller. Those of ordinary skill will recognize that the dedicated DVD controller button designations may be changed without departing from the spirit of the present invention.

TABLE 1

| Wired Game Controller button symbol | Dedicated Wireless DVD controller button |
|---|---|
| Start | Play and Pause |
| Select | On Screen Display (OSD) |
| X-button | Stop/Exit |
| Square Button | Main Menu |
| Triangle | DVD Menu |
| Circle | Confirm/Accept/OK |
| L1-Button | Back to Previous Chapter |
| L2-Button | Rewind |
| L3-Button | Toggle Subtitles |
| R1-Button | Skip to Next Chapter |
| R2-Button | Fast Forward |
| R3-Button | Toggle Sound Options |
| 'D'-Pad | Cycle through on screen menus |

When wireless adapter/receiver 10 is inserted into one of the communication ports of the game console, it is configured to receive only DVD player function control signals from controller 50 and thereby input such commands directly into the game console. Adapter 10 and controller 50 are not adapted to be used for any game playing functions of the game console. The power provided to controller 50 is generally provided by replaceable batteries, and the power needed to operate adapter 10 is provided either from the game console itself through the communication port, or through replaceable and/or rechargeable batteries.

Figure 3:
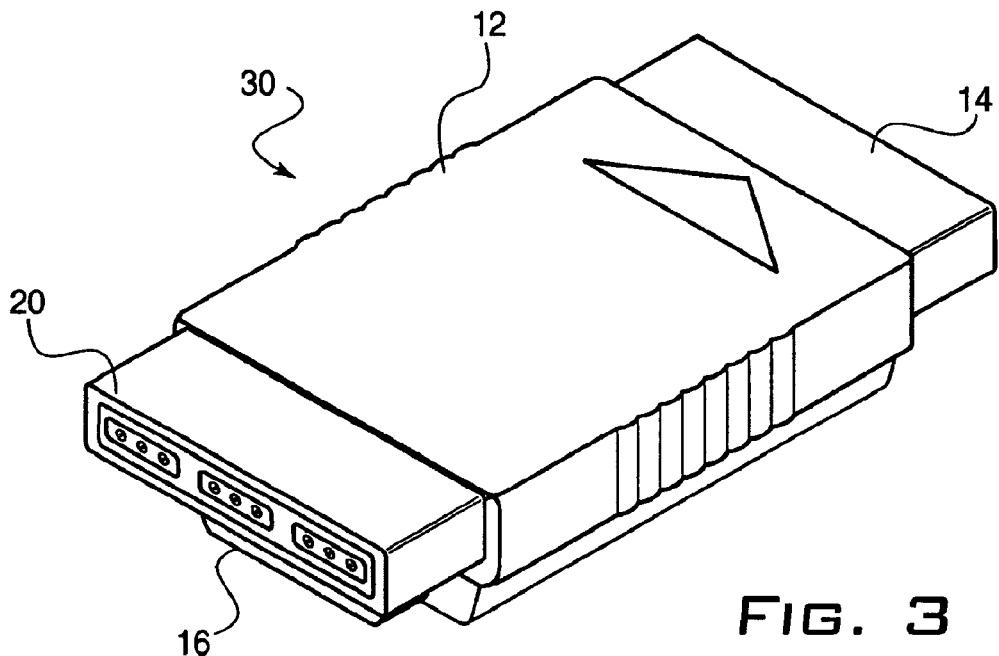
FIG. 3 is a perspective view of the game console wireless adapter device according to a second embodiment of the invention.
Figure 4A:
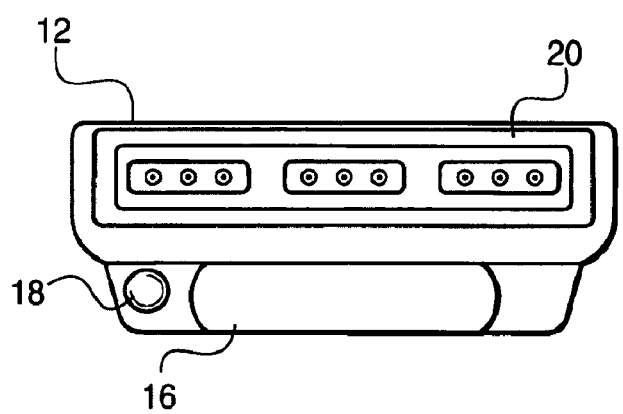
FIG. 4a is a front view of the wireless adapter device according to the second embodiment of the invention.
Figure 4B:
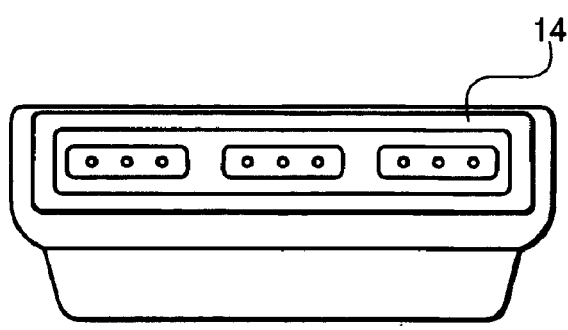
FIG. 4b is a rear view of the wireless adapter device according to the second embodiment of the invention.

FIGS. 3, 4a and 4b show a wireless adapter 30 according to a second embodiment of the invention. In this embodiment, adapter 30 includes an additional female game controller port 20. As described with reference to the first embodiment, male plug 14 is inserted into the game controller port of the game console. The added female game controller port 20 allows the wired game controller (not shown) to be plugged into the adapter while maintaining the IR communication between the adapter and the dedicated DVD controller.

It is to be understood that the use of IR wireless protocol as described herein is only one exemplary embodiment, and those of ordinary skill will recognize that other wireless protocol may be used such as, for example, radio frequencies (RF) as disclosed in U.S. Pat. No. 5,806,849, which is incorporated herein by reference.

The video game console is capable of detecting the type of disc inserted and automatically switch into that operating mode. For example, when a DVD is inserted into the game console, the game console automatically switches to DVD player mode and stands by for input DVD playing control commands from the game controller port. Thus, there is no requirement by the user to set the game console into DVD mode, or otherwise. Upon insertion of a DVD, the dedicated DVD controller of the present invention becomes immediately live and active for use in controlling the DVD functions of the game console.

Figure 13:
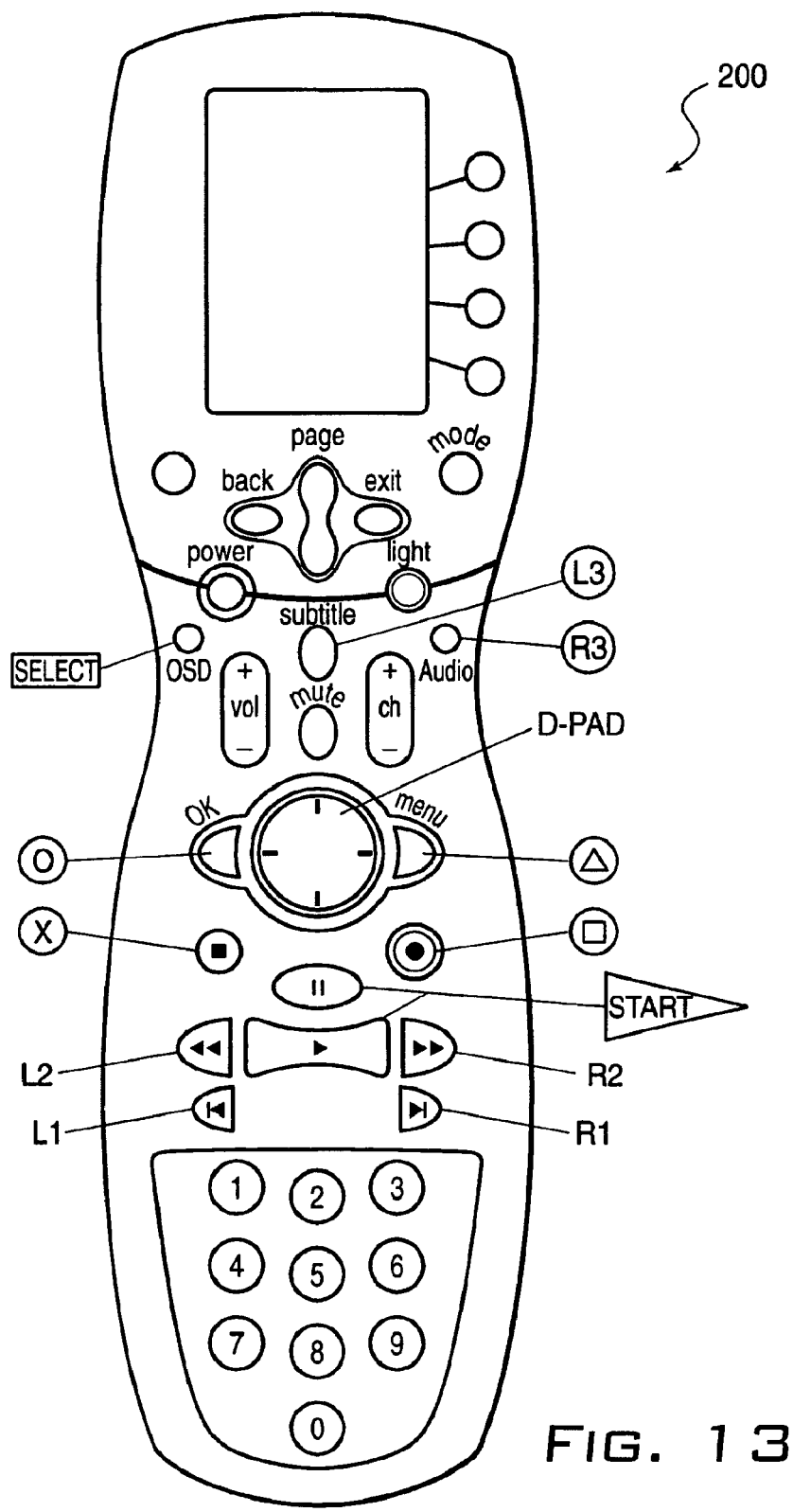
FIG. 13 is a top view of a universal remote control having the dedicated DVD control functions of the present invention.

In a further embodiment of the invention, remote control 50 will be a universal programmable remote control so that it may also be used to control other specified components of the user's entertainment system. Thus, additional buttons and functions such as volume control, power control, etc. can be added to remote 50 without departing from the scope of the present invention. Examples of these programmable features can be found in U.S. Pat. Nos. 6,008,735, 5,629,868 and 5,410,326, the entire contents of each incorporated herein by reference. FIG. 13 shows an example of a universal remote control 200 having a plurality of buttons and a display screen for aiding in the indication of the current operation mode of the remote control. When the predetermined code for the dedicated DVD player control of the video game console is selected, the various buttons corresponding to that control mode are activated. Once activated, the universal remote control 200 can control the dedicated DVD player functions of the video game console.

In addition, it is contemplated that universal remote control 200 will include both IR and RF transmission capability. In this manner, universal remote 200 will operate in both IR and/or RF modes depending on the programmed code and the device being controlled.

FIG. 6 shows an exemplary game console 60 that utilizes the dedicated DVD controller according to the present invention. Game console 60 includes a media drawer 66 an on/off reset button 62, an open/close button 64, memory slots 68a and 68b, game controller ports 70a and 70b, and other communication ports such as, for example, Universal Serial Bus (USB) ports 72a and 72b, an IEEE 1394 FireWire™ port 74 and a PCMCIA slot 75.

In accordance with additional embodiments of the invention, memory slots 68a and 68b, and the other communication ports 72a, 72b, 74 and 75 can also be used to connect the wireless adapter and provide dedicated DVD controls for the game console 60. FIGS. 7–12 shows the various different embodiments of the wireless adapter of the present invention.

In other contemplated embodiments, console 60 includes wireless receiver capability through the implementation of IR and/or RF. An IR window 63 and/or RF antenna 65 (external or internal) will allow the console 60 to receive game and/or non-game controls from an outside source. Thus, in this embodiment, the remote control device 60 or the universal remote control device 200 need only be programmed for the non-game media playing modes of the game console 60 and the need for the wireless adapter is eliminated.

Figure 8A:
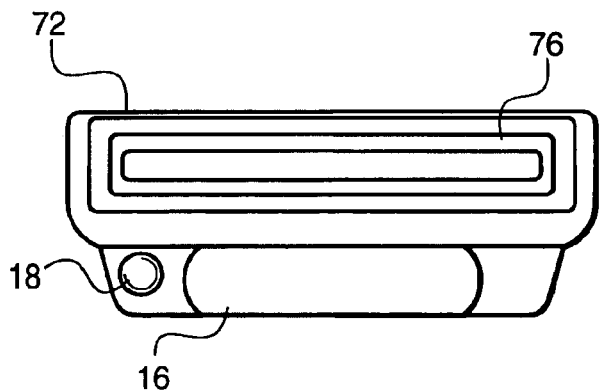
FIG. 8a is a front view of the wireless adapter device according to the third embodiment of the invention.
Figure 8B:
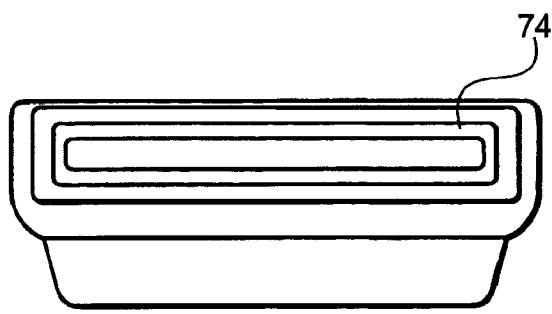
FIG. 8b is a rear view of the wireless adapter device according to the third embodiment of the invention.

FIGS. 7, 8a and 8b show an example of a memory slot wireless adapter 70 having a body 72, a male plug end 74 on one end for connection to one of the memory slots 68a and 68b, and a female plug end 76 for receiving a memory card that is otherwise inserted into the memory slot 68a or 68b when adapter 70 is inserted therein. The IR window 16 and indicator light 18 are the same as described previously. In accordance with one embodiment, adapter 70 includes an RF antenna 75 for receiving RF wireless signals when IR is not desired, and may also include an internal memory (not shown) that enables it to provide memory functions for the game console via the memory slot which adapter 70 is connected. Female plug end 76 is an optional feature that gives the used memory slot back to the user and may be provided depending on the configuration of the adapter 70.

Figure 9:
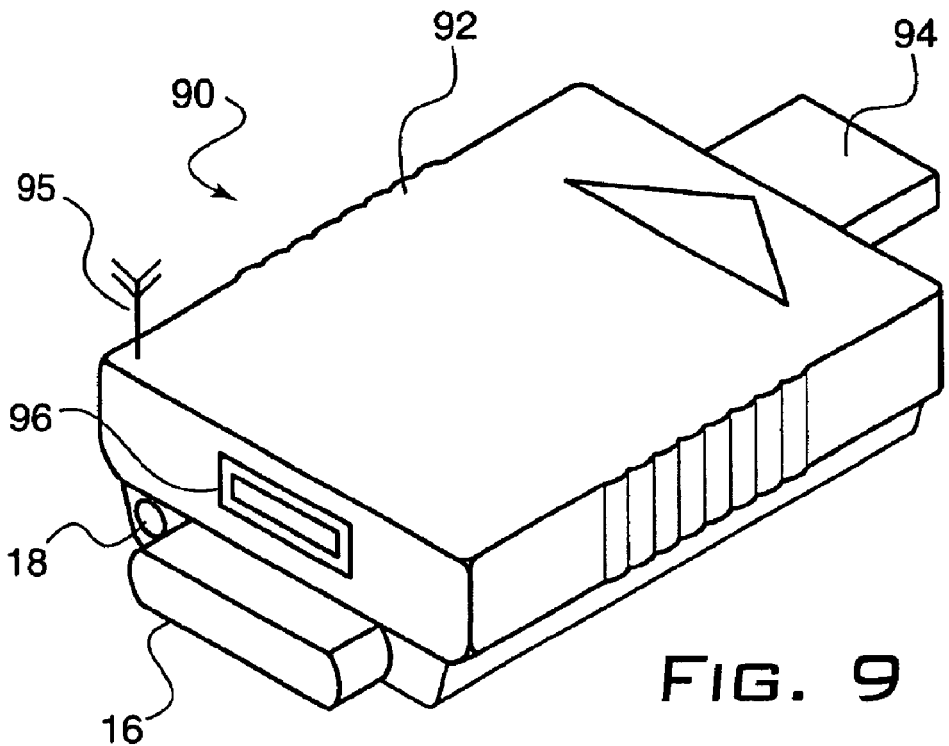
FIG. 9 is a perspective view of the game console wireless adapter device according to a fourth embodiment of the invention.
Figure 10:
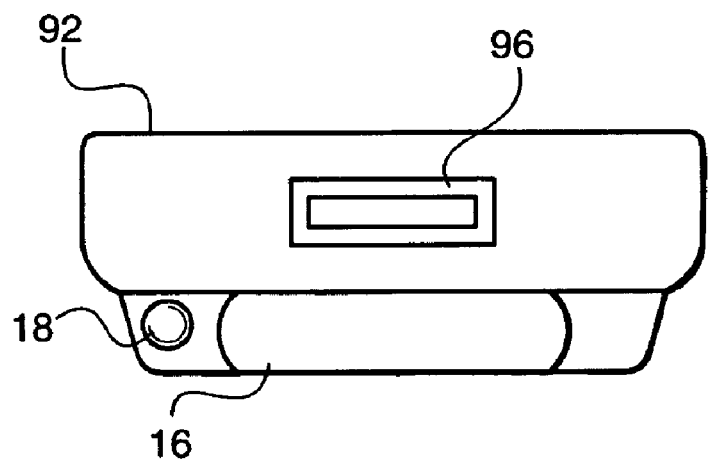
FIG. 10 is a front view of the wireless adapter device according to the fourth embodiment of the invention.

FIGS. 9 and 10 show an example of a USB wireless adapter 90 according to another embodiment of the invention. As shown, adapter 90 includes a housing 92, a male USB plug end 94 and a female USB plug end 96 for giving the utilized USB port back to the user. According to an RF embodiment, adapter 90 includes and RF antenna 95 and associated circuitry for enabling RF communication between the adapter 90 and the game controller (not shown).

Figure 11:
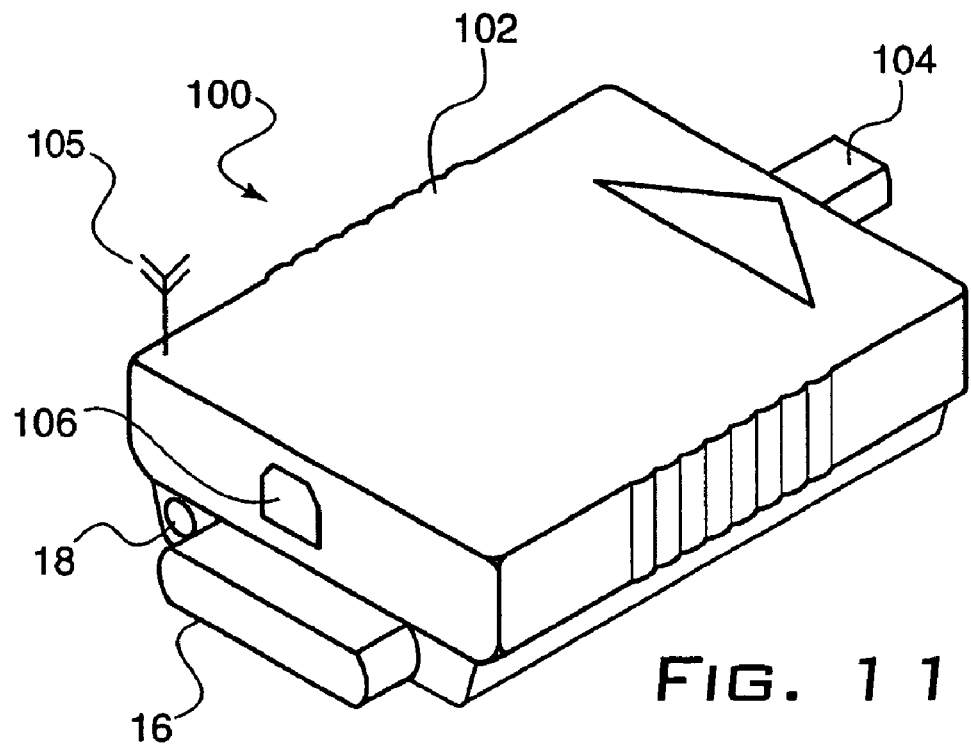
FIG. 11 is a perspective view of the game console wireless adapter device according to a fifth embodiment of the invention.
Figure 12:
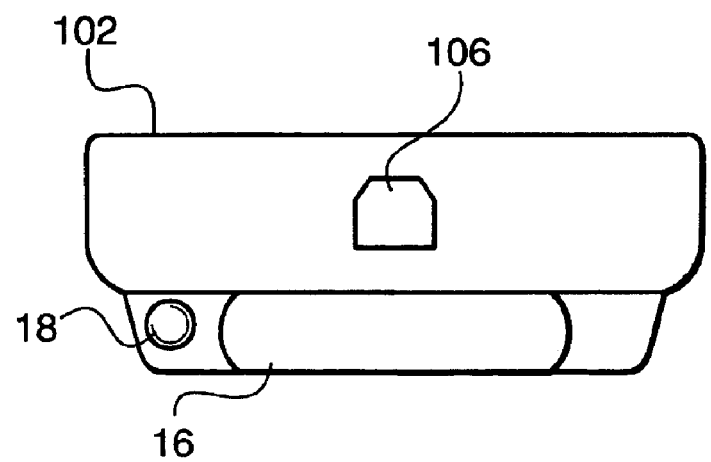
FIG. 12 is a front view of the wireless adapter device according to the fifth embodiment of the invention.

FIGS. 11 and 12 show a wireless adapter 100 according to yet another embodiment of the invention. Adapter 100 includes a housing 102, a male IEEE 1394 FireWire™ plug end 94 and a female IEEE 1394 FireWire™ plug end 106 for giving the utilized FireWire™ port to the user. According to an RF embodiment, adapter 100 includes an RF antenna 105 and associated circuitry for enabling RF communication between the adapter 100 and the game controller (not shown).

According to one embodiment, the circuitry contained within adapters 10, 30, 70, 90 and 100 is powered by obtaining such power from the console through the respective communication ports. In other embodiments, the adapters can contain their own battery power that can be rechargeable or replaceable batteries.

Figure 14:
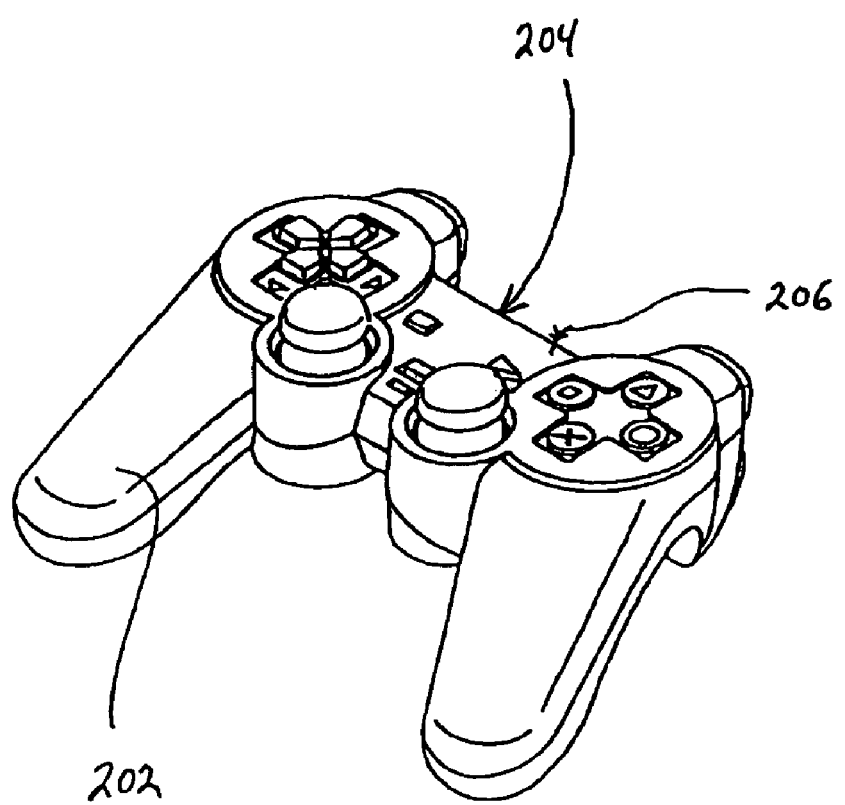
FIG. 14 is a perspective view of an exemplary wireless game controller usable with the dedicated DVD controller wireless adapter according to an embodiment of the invention.

FIG. 14 shows a wireless controller 202 which can have an IR transmitter 204 and/or an RF transmitter designated by antenna 206. Wireless controller 202 can provide wireless game control signals to the game console 60 via the wireless adapter 30, 70, 90 and/or 100 that is used for the dedicated DVD remote control transmitter 50 or the universal remote control 200. In this embodiment, wireless controller 202 can operate using the same wireless protocol as the dedicated remote control device 50 or universal remote controller 200, or alternatively, can operate using a different wireless protocol as that used in the remote controllers 50, 200. For example, the remote controllers 50, 200 can use IR to operate with the wireless adapter, while wireless controller 202 utilizes RF to communicate with the wireless adapter. Those of skill in the art will recognize that other wireless protocols can be implemented without departing from the spirit of the present invention.

While there have been shown, described and pointed out fundamental novel features of the invention as applied to preferred embodiments thereof, it will be understood that various omissions, substitutions, changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A wireless system for a video game console having at least one of an InfraRed (IR) receiver and a Radio Frequency (RF) receiver, and further having at least two operation modes including (i) a first game mode capable of playing video games and (ii) a second entertainment mode capable of playing DVD videos, the wireless system comprising:
   a dedicated DVD remote control transmitter having DVD player function control buttons and having an absence of control over game functions of the video game console at all times, said dedicated remote control transmitter wirelessly transmitting DVD player control commands to at least one of the IR receiver and the RF receiver for controlling DVD player functions of the video game console when in said second entertainment mode; and
   a wireless game controller for wirelessly transmitting game control commands to at least one of the IR receiver and the RF receiver to control a game being played when the video game console is in said first game mode.

2. The wireless system according to claim 1, wherein said dedicated DVD remote control transmitter wirelessly transmits the DVD player control commands to only the IR receiver and said wireless game controller wirelessly transmits the game control commands to only the RF receiver.

3. The wireless system according to claim 1, wherein said dedicated DVD remote control transmitter wirelessly transmits the DVD player control commands to only the RF receiver and said wireless game controller wirelessly transmits the game control commands to only the IR receiver.

4. The wireless system according to claim 1, wherein said dedicated DVD remote control transmitter wirelessly transmits the DVD player control commands to both the IR receiver and the RF receiver depending upon at least a programmed code and said wireless game controller wirelessly transmits the game control commands to only one of the IR receiver and the RF receiver.

5. The wireless system according to claim 1, wherein said dedicated DVD remote control transmitter wirelessly transmits the DVD player control commands to only one of the IR receiver and the RF receiver and said wireless game controller wirelessly transmits the game control commands to both the IR receiver and the RF receiver depending upon at least a programmed code.

6. The wireless system according to claim 1, wherein said dedicated DVD remote control transmitter wirelessly transmits the DVD player control commands and said wireless game controller wirelessly transmits the game control commands respectively alternating between the IR receiver and the RF receiver so that, at any given time, the IR receiver is only used for one of the said dedicated remote control transmitter and said wireless game controller while the RF receiver is only used for the other one of said dedicated remote control transmitter and said wireless game controller.

7. A wireless system for a video game console having at least one of an InfraRed (IR) receiver and a Radio Frequency (RF) receiver and further having at least two operation modes including (i) a first game mode capable of playing video games and (ii) a second entertainment mode capable of playing DVD videos, the wireless system comprising:
   a universal remote controller for wirelessly controlling a plurality of different controllable devices including wirelessly transmitting DVD player control commands to at least one of the IF receiver and the RF receiver of the video game console, said universal remote controller having an absence of control over game functions of the video game console at all times and further having a code set corresponding to the second entertainment mode of the video game console; and
   a wireless game controller for wirelessly transmitting game control commands to at least one of the IF receiver and the RF receiver of the video game console to control a game being played when the video game console is operating in the first game mode.

8. The wireless system according to claim 7, wherein said universal remote controller further comprises:
   a memory for storing at least one code set corresponding to at least one brand of controllable devices including the code set for controlling the second entertainment mode of the video game console; and
   a plurality of buttons for providing access to any one of the at least one code set and enabling an operation mode for controlling a selected controllable device, said plurality of buttons including DVD player function control buttons for controlling the DVD player functions of the video game console when operating in the second entertainment mode.

9. The wireless system according to claim 7, wherein said universal remote controller wirelessly transmits the DVD player control commands to only the IR receiver and said wireless game controller wirelessly transmits the game control commands to only the RF receiver.

10. The wireless system according to claim 7, wherein said universal remote controller wirelessly transmits the DVD player control commands to only the RF receiver and said wireless game controller wirelessly transmits the game control commands to only the IR receiver.

11. The wireless system according to claim 7, wherein said universal remote controller wirelessly transmits the DVD player control commands to both the IR receiver and the RF receiver depending upon at least a programmed code and said wireless game controller wirelessly transmits the game control commands to only one of the IR receiver and the RF receiver.

12. The wireless system according to claim 7, wherein said universal remote controller wirelessly transmits the DVD player control commands to only one of the IR receiver and the RF receiver and said wireless game controller wirelessly transmits the game control commands to both the IR receiver and the RF receiver depending upon at least a programmed code.

13. The wireless system according to claim 7, wherein said universal remote controller wirelessly transmits the DVD player control commands and said wireless game controller wirelessly transmits the game control commands respectively alternating between the IR receiver and the RF receiver so that, at any given time, the IR receiver is only used for one of the said universal remote controller and said wireless game controller while the RF receiver is only used for the other one of said universal remote controller and said wireless game controller.

14. A wireless system for a video game console having at least one of an InfraRed (IR) receiver and a Radio Frequency (RF) receiver and further having at least two operation modes including (i) a first game mode capable of playing video games and (ii) a second entertainment mode capable of non-game media, the wireless system comprising:
- a dedicated DVD remote control transmitter having an absence of control over game functions of the video game console at all times and further having non-game media player function control buttons, said dedicated DVD remote control transmitter wirelessly transmitting non-game media player control commands to at least one of the IR receiver and the RF receiver for controlling non-game media player functions of the video game console when in said second entertainment mode; and
- a wireless game controller for wirelessly transmitting game control commands to at least one of the IR receiver and the RF receiver to control a game being played when the video game console is in said first game mode.

15. The wireless system according to claim 14, wherein said dedicated DVD remote control transmitter wirelessly transmits the non game media player control commands to only the IR receiver and said wireless game controller wirelessly transmits the game control commands to only the RF receiver.

16. The wireless system according to claim 14, wherein said dedicated DVD remote control transmitter wirelessly transmits the non-game media player control commands to only the RF receiver and said wireless game controller wirelessly transmits the game control commands to only the IR receiver.

17. The wireless system according to claim 14, wherein said dedicated DVD remote control transmitter wirelessly transmits the non-game media player control commands to both the IR receiver and the RF receiver depending upon at least a programmed code and said wireless game controller wirelessly transmits the game control commands to only one of the IR receiver and the RF receiver.

18. The wireless system according to claim 14, wherein said dedicated DVD remote control transmitter wirelessly transmits the non-game media player control commands to only one of the IR receiver and the RF receiver and said wireless game controller wirelessly transmits the game control commands to both the IR receiver and the RF receiver depending upon at least a programmed code.

19. The wireless system according to claim 14, wherein said dedicated DVD remote control transmitter wirelessly transmits the non-game media player control commands and said wireless game controller wirelessly transmits the game control commands respectively alternating between the IR receiver and the RF receiver so that, at any given time, the IR receiver is only used for one of the said dedicated remote control transmitter and said wireless game controller while the RF receiver is only used for the other one of said dedicated remote control transmitter and said wireless game controller.

* * * * *